(12) United States Patent
Hong et al.

(10) Patent No.: US 10,469,566 B2
(45) Date of Patent: Nov. 5, 2019

(54) ELECTRONIC DEVICE AND CONTENT PROVIDING METHOD THEREOF

(71) Applicant: Samsung Electronics Co., Ltd., Suwon-si (KR)

(72) Inventors: Joon Sung Hong, Yongin-si (KR); Kyung Eun Park, Suwon-si (KR); Bong Joo Seo, Suwon-si (KR); Haebahremahram Suh, Seoul (KR); Ho Jun Jaygarl, Hwaseong-si (KR); Eun Jung Hyun, Seoul (KR); Moon Bae Song, Seoul (KR); Cheol Ho Cheong, Seoul (KR); Joon Ho Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 15/014,254

(22) Filed: Feb. 3, 2016

(65) Prior Publication Data

US 2016/0226956 A1    Aug. 4, 2016

(30) Foreign Application Priority Data

Feb. 3, 2015    (KR) .................. 10-2015-0016935

(51) Int. Cl.
*H04L 29/08*        (2006.01)
*H04N 21/436*     (2011.01)
(Continued)

(52) U.S. Cl.
CPC .......... *H04L 67/10* (2013.01); *H04N 21/436* (2013.01); *H04N 21/44218* (2013.01); *H04N 21/4508* (2013.01)

(58) Field of Classification Search
CPC .............................. H04L 67/10; H04N 21/436
(Continued)

(56) References Cited

U.S. PATENT DOCUMENTS 8,341,405 B2    12/2012    Meijer et al.
8,392,594 B2    3/2013    Georgis et al.
(Continued)

FOREIGN PATENT DOCUMENTS

| CN | 1723675 A | 1/2006 |
|---|---|---|
| CN | 101632072 A | 1/2010 |
| CN | 104169932 A | 11/2014 |

OTHER PUBLICATIONS

Int'l Search Report and Written Opinion for PCT/KR2016/001152 dated May 17, 2016.
(Continued)

*Primary Examiner* — David R Lazaro
*Assistant Examiner* — Zia Khurshid
(74) *Attorney, Agent, or Firm* — Jefferson IP Law, LLP

(57) ABSTRACT

An electronic device is provided. The electronic device includes a communication module configured to request from at least one peripheral electronic device to transmit device information, and to receive the device information from the at least one peripheral electronic device. The electronic device also includes a control module configured to analyze attributes of content using content information if a content providing event occurs, to analyze attributes of the at least one peripheral electronic device using the device information and the attributes of the electronic device, and to determine at least one target device to provide the content to a user, according to the result of analyzing the attributes of the content and the result of analyzing the attributes of the electronic device and the at least one peripheral electronic device.

16 Claims, 8 Drawing Sheets

(51) Int. Cl.
*H04N 21/442* (2011.01)
*H04N 21/45* (2011.01)

(58) Field of Classification Search
USPC .......................................................... 709/217
See application file for complete search history.

(56) References Cited

U.S. PATENT DOCUMENTS

| | | | |
|---|---|---|---|
| 8,607,295 | B2 | 12/2013 | Bhatia et al. |
| 8,619,095 | B2 | 12/2013 | Jaramillo et al. |
| 8,631,473 | B2 | 1/2014 | Bhatia et al. |
| 8,635,674 | B2 | 1/2014 | Bhatia et al. |
| 8,638,344 | B2 | 1/2014 | Jaramillo et al. |
| 8,650,587 | B2 | 2/2014 | Bhatia et al. |
| 8,667,520 | B2 | 3/2014 | Bhatia et al. |
| 8,676,882 | B2 | 3/2014 | Georgis et al. |
| 8,799,500 | B2 | 8/2014 | Georgis et al. |
| 8,955,001 | B2 | 2/2015 | Bhatia et al. |
| 8,959,145 | B2 | 2/2015 | Georgis et al. |
| 8,978,086 | B2 | 3/2015 | Bhatia et al. |
| 9,049,577 | B2 | 6/2015 | Fyke et al. |
| 9,143,248 | B2 | 9/2015 | Benting et al. |
| 9,237,377 | B2 | 1/2016 | Bhatia et al. |
| 9,264,764 | B2 | 2/2016 | Bhatia et al. |
| 10,083,283 | B2 | 9/2018 | Fyke et al. |
| 2004/0139312 | A1* | 7/2004 | Medvinsky ............. G06F 21/10 713/150 |
| 2005/0078677 | A1 | 4/2005 | Benting et al. |
| 2008/0082538 | A1 | 4/2008 | Meijer et al. |
| 2008/0104393 | A1* | 5/2008 | Glasser ............ G06F 17/30575 713/165 |
| 2008/0183794 | A1* | 7/2008 | Georgis ................ H04L 67/104 709/201 |
| 2008/0208985 | A1 | 8/2008 | Georgis et al. |
| 2011/0316769 | A1 | 12/2011 | Boettcher et al. |
| 2012/0105730 | A1 | 5/2012 | Eliezerov et al. |
| 2012/0159149 | A1* | 6/2012 | Martin ................ H04L 63/0823 713/151 |
| 2013/0014136 | A1 | 1/2013 | Bhatia et al. |
| 2013/0014137 | A1 | 1/2013 | Bhatia et al. |
| 2013/0014138 | A1 | 1/2013 | Bhatia et al. |
| 2013/0014141 | A1 | 1/2013 | Bhatia et al. |
| 2013/0014143 | A1 | 1/2013 | Bhatia et al. |
| 2013/0014144 | A1 | 1/2013 | Bhatia et al. |
| 2013/0014145 | A1 | 1/2013 | Bhatia et al. |
| 2013/0014146 | A1 | 1/2013 | Bhatia et al. |
| 2013/0014153 | A1 | 1/2013 | Bhatia et al. |
| 2013/0014158 | A1 | 1/2013 | Bhatia et al. |
| 2013/0014222 | A1 | 1/2013 | Bhatia et al. |
| 2013/0014223 | A1 | 1/2013 | Bhatia et al. |
| 2013/0019258 | A1 | 1/2013 | Bhatia et al. |
| 2013/0019262 | A1 | 1/2013 | Bhatia et al. |
| 2013/0166698 | A1 | 6/2013 | Georgis et al. |
| 2013/0196590 | A1 | 8/2013 | Fyke et al. |
| 2013/0235058 | A1 | 9/2013 | Jaramillo et al. |
| 2013/0235073 | A1 | 9/2013 | Jaramillo et al. |
| 2013/0304817 | A1 | 11/2013 | Hu et al. |
| 2014/0173641 | A1 | 6/2014 | Bhatia et al. |
| 2014/0173643 | A1 | 6/2014 | Bhatia et al. |
| 2014/0181715 | A1 | 6/2014 | Axelrod et al. |
| 2014/0195642 | A1 | 7/2014 | Georgis et al. |
| 2015/0264541 | A1 | 9/2015 | Fyke et al. |
| 2015/0334469 | A1 | 11/2015 | Bhatia et al. |
| 2015/0358667 | A1 | 12/2015 | Bhatia et al. |
| 2015/0365726 | A1 | 12/2015 | Benting et al. |
| 2016/0007083 | A1 | 1/2016 | Gurha |
| 2017/0235926 | A1 | 8/2017 | Fyke et al. |

OTHER PUBLICATIONS

European Search Report for EP 16153791.5 dated Jun. 20, 2016.
Australian Office Action Appln. No. 2016216259 dated Feb. 25, 2018 (5 pgs).
Chinese Office Action dated Jul. 31, 2019, issued in Chinese Patent Application No. 201610076372.1.

* cited by examiner

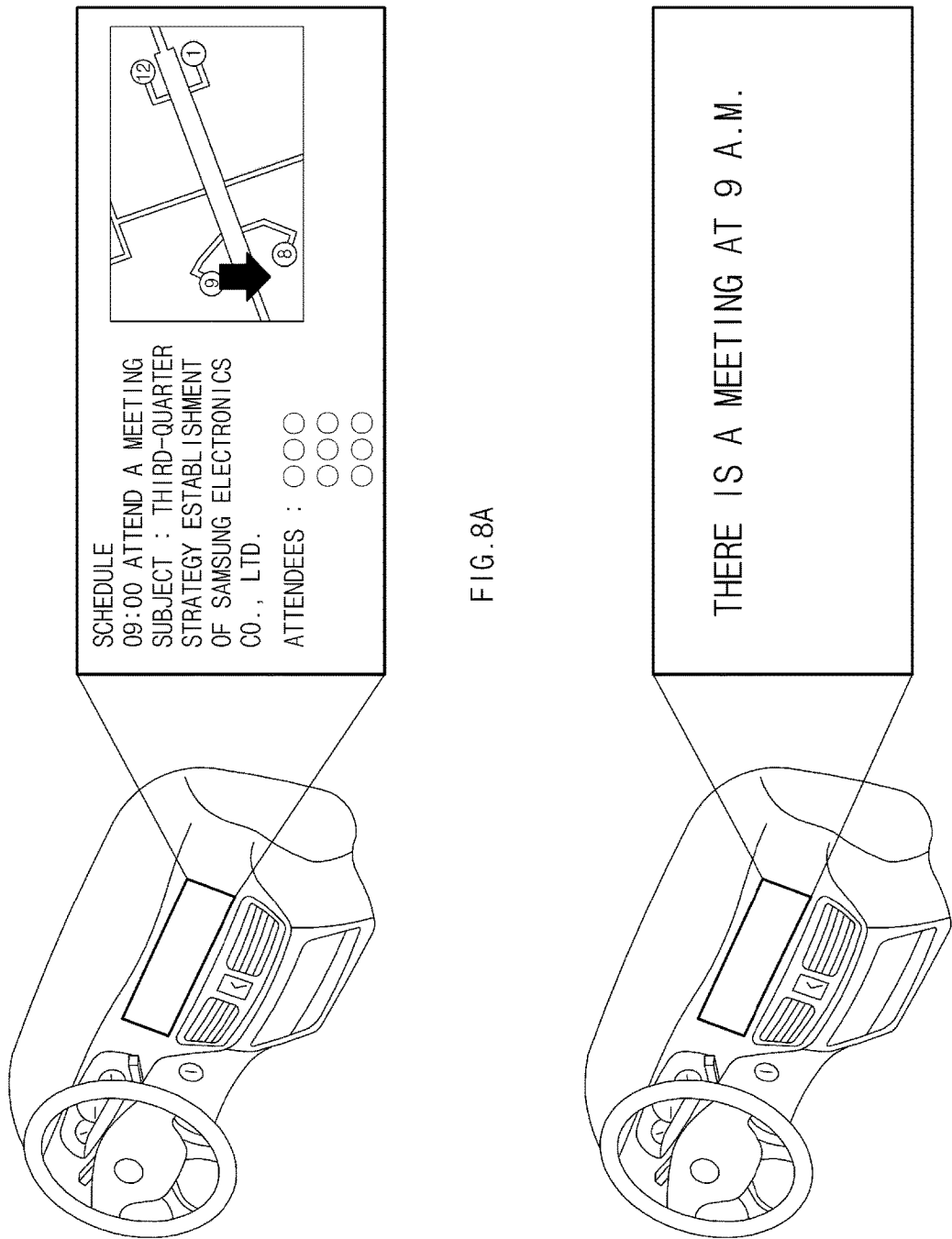

ELECTRONIC DEVICE AND CONTENT PROVIDING METHOD THEREOF

RELATED APPLICATION(S)

This application claims the benefit under 35 U.S.C. § 119(a) of a Korean patent application filed on Feb. 3, 2015 in the Korean Intellectual Property Office and assigned Serial number 10-2015-0016935, the entire disclosure of which is hereby incorporated by reference.

BACKGROUND

The present disclosure relates to an electronic device for providing content in a way suitable for users and a content providing method thereof.

Modern electronic devices may support a variety of functions such as emails, web surfing, capture images, instant messages, schedule management, play/stream video files, and play/stream audio files, to users. As more and more users now possess a plurality of electronic devices such as smartphones, tablet personal computers (PCs), wearable devices, smart televisions (TVs), and desktop PCs, a variety of services may be provided to users by interworking between the various electronic devices.

SUMMARY

An aspect of the present disclosure is to provide an electronic device able to provide content more conveniently and easily recognized by a user, using a variety of information collected through a plurality of electronic devices which may interwork.

In accordance with an aspect of the present disclosure, a first electronic device is provided. The first electronic device may include a communication module configured to request device information of at least one second electronic device from the at least one second electronic device, and configured to receive the device information from the second electronic device(s). The first electronic device may also include a control module configured to, upon occurrence of a content providing event for providing content to a user of the first electronic device, analyze attributes of a content of the content providing event, and configured to analyze attributes of the first electronic device with access to its device information and attribute of the second electronic device(s) using the received device information. The first electronic device may then determine at least one target electronic device to provide the content to the user from among the first electronic device and the at least one second electronic device, where the target electronic device(s) is determined according to a result of analyzing the attributes of the content and a result of analyzing the attributes of the first electronic device and the at least one second electronic device.

In accordance with another aspect of the present disclosure, a content providing method of a first electronic device is provided. The content providing method may include requesting device information of at least one second electronic device from the at least one second electronic device, analyzing attributes of the first electronic device and the at least one second electronic device using the device information. The content providing method may if a content providing event occurs for providing content to a user of the first electronic device analyze attributes of a content of the content providing event, and determine at least one target electronic device to provide the content to the user from among the first electronic device and the at least one second electronic device, according to a result of analyzing the attributes of the content and a result of analyzing the attributes of the first electronic device and the at least one second electronic device.

In accordance with another aspect of the present disclosure, a computer-readable recording medium is provided. The computer-readable recording medium having embodied thereon a program in a first electronic device for executing a method of requesting device information of at least one second electronic device from the at least one second electronic device, analyzing attributes of the first electronic device and the at least one second electronic device using the device information. The content providing method may if a content providing event occurs for providing content to a user of the first electronic device analyze attributes of a content of the content providing event, and determine at least one target electronic device to provide the content to the user from among the first electronic device and the at least one second electronic device, according to a result of analyzing the attributes of the content and a result of analyzing the attributes of the first electronic device and the at least one second electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8A and 8B are drawings illustrating content provided to a user according to various embodiments of the present disclosure.

Throughout the drawings, it should be noted that like reference numbers are used to depict the same or similar elements, features, and structures.

DETAILED DESCRIPTION

Figure 1:
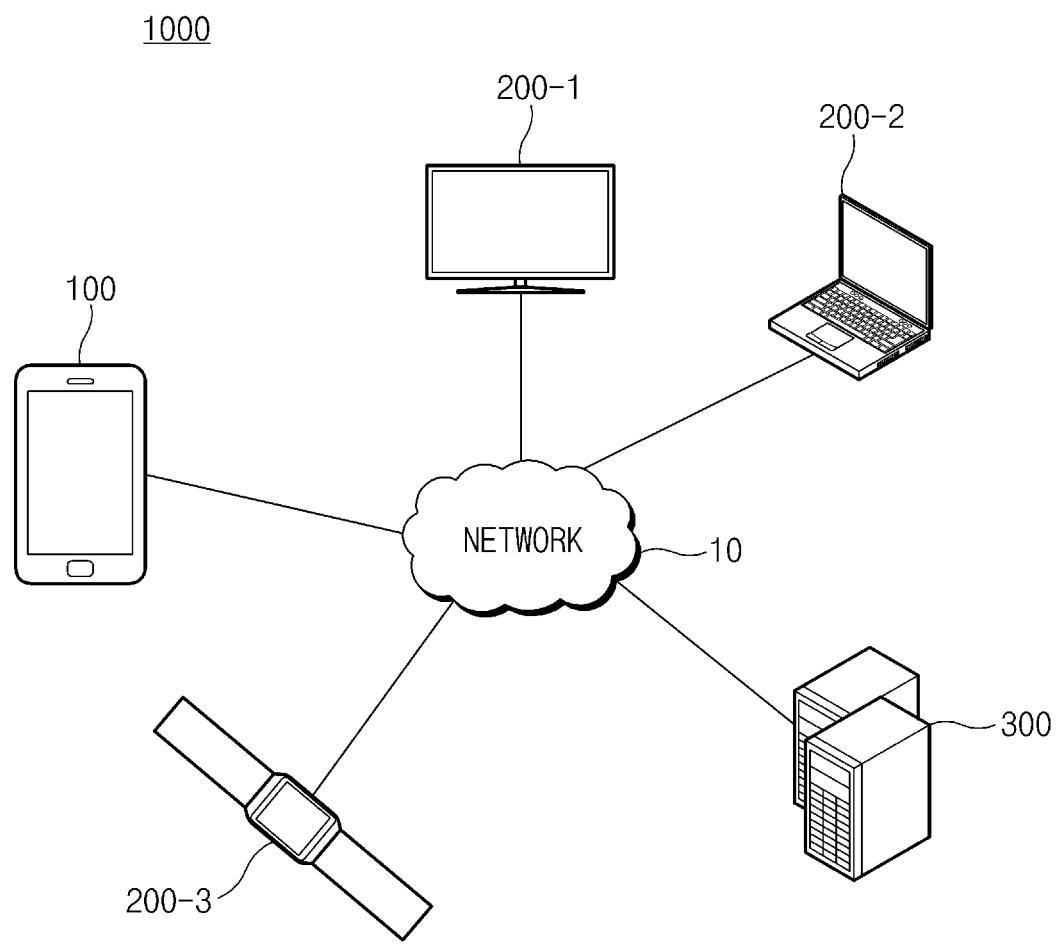
FIG. 1 is a drawing illustrating a configuration of a content providing system according to various embodiments of the present disclosure.

Various embodiments of the present disclosure will be described with reference to the accompanying drawings.

However, it should be understood that there is no intent to limit the present disclosure to the particular forms disclosed herein. Rather, the present disclosure should be construed to cover various modifications, equivalents, and/or alternatives of embodiments of the present disclosure. In describing the drawings, similar reference numerals may be used to designate similar constituent elements.

As used herein, the expression "have," "may have," "include," or "may include" refers to the existence of a corresponding feature (e.g., numeral, function, operation, or constituent element such as component) and does not exclude one or more additional features. As used herein, singular forms may include plural forms unless the context clearly indicates otherwise.

As used herein, the expression "A or B" refers to either just A or just B. The expression "A and/or B," "at least one of A and B," "at least one of A or B," or "one or more of A and/or B" and the like may include any or all possible combinations of the specified items. For example, the expression "A and/or B" may include (1) at least one A, (2) at least one B, or (3) both at least one A and at least one B. If a specified item is for a group, the combination refers to the group and not to the individual members of the group.

The expressions such as "1st," "2nd," "first," or "second," and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening elements (e.g., a third element).

Depending on the situation, the expression "configured to" used herein may be used as, for example, the expression "suitable for," "having the capacity to," "designed to," "adapted to," "made to," or "capable of." The term "configured to" must not mean only "specifically designed to" perform by means of hardware. Instead, the expression "a device configured to" may mean that the device is "capable of" operating together with another device or other components. For example, a "processor configured to perform A, B, and C" may mean a generic-purpose processor (e.g., a central processing unit (CPU) or an application processor) that may perform corresponding operations by executing one or more software programs, or a dedicated processor (e.g., an embedded processor) for performing a corresponding operations.

The terms used in the present disclosure are only used to describe specific embodiments and are not intended to limit the present disclosure. Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have meanings equal to the contextual meanings in the relevant field of the art unless clearly defined in the present disclosure. However, it should be noted that a term defined in the present disclosure should not be interpreted to exclude embodiments of the present disclosure unless specifically stated so.

Accordingly, a term should be used as defined in this disclosure and in light of usage in context of a description in this disclosure. If that is not found, then the term should be used as understood by a person skilled in the field of this disclosure at the time of this disclosure. Then the definition of the term should be searched for in a technical dictionary relevant to the field of the disclosure at the time of this disclosure, and finally to a general purpose dictionary at the time of this disclosure.

Electronic devices according to various embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, or wearable devices (e.g., smart glasses, head-mounted-devices (HMDs), an electronic apparel, electronic bracelets, electronic necklaces, electronic appcessories, electronic tattoos, smart mirrors, or smart watches).

According to various embodiments of the present disclosure, the electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™Apple TV™, or Google TV™), game consoles (e.g., Xbox™ and PlayStation™), electronic dictionaries, electronic keys, camcorders, or electronic picture frames.

According to various embodiments of the present disclosure, the electronic devices may include at least one of various medical devices such as various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like, navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, but may also include new electronic devices developed as technology progresses.

Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a drawing illustrating a configuration of a content providing system according to various embodiments of the present disclosure.

Referring to FIG. 1, a content providing system 1000 may include a plurality of electronic devices and a server 300. The plurality of electronic devices included in the content providing system 1000 may include a main electronic device 100 and peripheral electronic devices 200-1 to 200-3. The peripheral electronic devices 200-1 to 200-3 may refer to electronic devices present within a communication range (or a coverage range) of the main electronic device 100. For example, if a main electronic device is located in a home of its user, the peripheral electronic devices may be a television (TV), a desktop personal computer (PC), and the like in his or her living room. For another example, if the main electronic device is located in a vehicle, a peripheral electronic device may be an audio, video, navigation (AVN) device or a heads up display (HUD) mounted in the vehicle.

The main electronic device 100, the peripheral electronic devices 200-1 to 200-3, and the server 300 may connect and communicate with each other over a network 10. For one example, the main electronic device 100, the peripheral electronic devices 200-1 to 200-3, and the server 300 may connect through a local-area wireless communication network such as a Bluetooth communication network, a near field communication (NFC) network, or a ZigBee communication network. For another example, the main electronic device 100, the peripheral electronic devices 200-1 to 200-3, and the server 300 may connect through an internet network or a mobile communication network.

According to an embodiment of the present disclosure, the main electronic device 100 may receive device information of the peripheral electronic devices 200-1 to 200-3 from the peripheral electronic devices 200-1 to 200-3 or the server 300. The main electronic device 100 may analyze the received device information as well as its own device information. The server 300, for example, may have stored the device information of the peripheral electronic devices 200-1 to 200-3. The device information may include information about an electronic device (e.g., the main electronic device 100 or one of the peripheral electronic devices 200-1 to 200-3) and information about a user of the electronic device.

This information may be, for example, device identification information, information about whether the electronic device is available, the location of the electronic device, the size of the electronic device, the number of users around the electronic device, locations of the users around the electronic device, the distance between the electronic device and the user, the user identification information, sight of the user (or whether viewable to the user), whether the user performs physical activities, whether the user is asleep, location of the user, a device preference of the user, device usage history of the user, content usage history of the user, an input/output source, a type of content that may be output (e.g., an image or audio format), audio output device currently connected (e.g., an earphone or a speaker), environment settings (e.g., a volume, screen brightness, and the like), and the like. The type of content may also be referred to as the form of content.

According to an embodiment of the present disclosure, the main electronic device 100 may analyze (determine or verify) attributes of the content. If a content providing event occurs, the main electronic device 100 may analyze attributes of the content using content information or device information. The content information may include metadata of content or details of the content. For example, the content information may include all information that may be directly verified from metadata or the details of the content, such as type of content (e.g., text, image, audio, and the like), size of the content, content provider, content producer, content sender, content receiver, and details of the content. The attributes of the content may include, for example, at least one of type of the content, size of the content, security level of content, or importance of the content. The security level may be, for example, a private level, a protected level, or a public level. The security level will be discussed in more detail with respect to FIG. 4. According to an embodiment of the present disclosure, the main electronic device 100 may store and manage the result (or a content context) of analyzing the attributes of the content.

According to an embodiment of the present disclosure, the main electronic device 100 may analyze (or determine) attributes of the electronic device (e.g., the main electronic device 100 or the peripheral electronic devices 200-1 to 200-3). The main electronic device 100 may analyze attributes of the electronic device (e.g., the main electronic device 100 or the peripheral electronic devices 200-1 to 200-3) using device information. The main electronic device 100 may analyze attributes of the electronic device (e.g., the main electronic device 100 or one of the peripheral electronic devices 200-1 to 200-3) periodically or if a content providing event occurs. The attributes of the electronic device may include, for example, device identification information, security level of the electronic device, location of the electronic device, distance between the electronic device and a user, direction of the electronic device, an input/output source, a possession (or stored) data list, or owner information of the electronic device. These terms will be described with respect to FIG. 4. According to an embodiment of the present disclosure, the main electronic device 100 may store and manage the result (or device context) of analyzing the attributes of the electronic device.

According to an embodiment of the present disclosure, the main electronic device 100 may analyze a state of the user. The main electronic device 100 may analyze the state of the user periodically or if a content providing event occurs. The main electronic device 100 may analyze the state of the user using device information. The state of the user may include, for example, at least one of activity state of the user, content recognizable state of the user, device preference of the user, or content preference of the user, and these terms will be explained in more detail with respect to FIG. 4. According to an embodiment of the present disclosure, the main electronic device 100 may store and manage the result (e.g., a user context) of analyzing the state of the user.

According to various embodiments of the present disclosure, the content context, the device context, or the user context may be generated according to content information or device information. The content context, the device context, or the user context may include some of the content information or the device information or may include information determined according to at least one of the content information or the device information. According to various embodiments of the present disclosure, the content context, the device context, or the user context may be stored in the form of a data table or may be stored in the form of a file having an extension such as "xml" and "html."

According to various embodiments of the present disclosure, the main electronic device 100 may determine at least one device to provide the content, according to the result of analyzing the attribute of the content, the attributes of the electronic device, or the state of the user. According to an embodiment of the present disclosure, if determining the device to provide the content, the main electronic device 100 may determine a content providing method. The main electronic device 100 may determine, for example, at least one of content providing type, content providing time, or details of content to be provided.

According to an embodiment of the present disclosure, the peripheral electronic devices 200-1 to 200-3 may transmit their device information to the main electronic device 100 or the server 300. The peripheral electronic devices 200-1 to 200-3 may verify and transmit the device information periodically or upon receiving a request from the main electronic device 100.

According to various embodiments of the present disclosure, each of the main electronic device 100 and peripheral electronic devices 200-1 to 200-3 may be a smartphone, a tablet PC, a desktop PC, a notebook PC, a smart TV, a wearable device (e.g., a smart watch, a smart glass, a smart band, and the like), or an AVN system for vehicle.

According to an embodiment of the present disclosure, the server 300 may receive device information from the plurality of electronic devices (e.g., the main electronic device 100 and the peripheral electronic devices 200-1 to 200-3) connected to the network 10. According to an embodiment of the present disclosure, the server 300 may store and continuously update device information received from the plurality of electronic devices. According to an embodiment of the present disclosure, if the main electronic device 100 directly receives device information from the peripheral electronic devices 200-1 to 200-3 (or another electronic device), the server 300 may be omitted from the components of the content providing system 1000.

Figure 2:
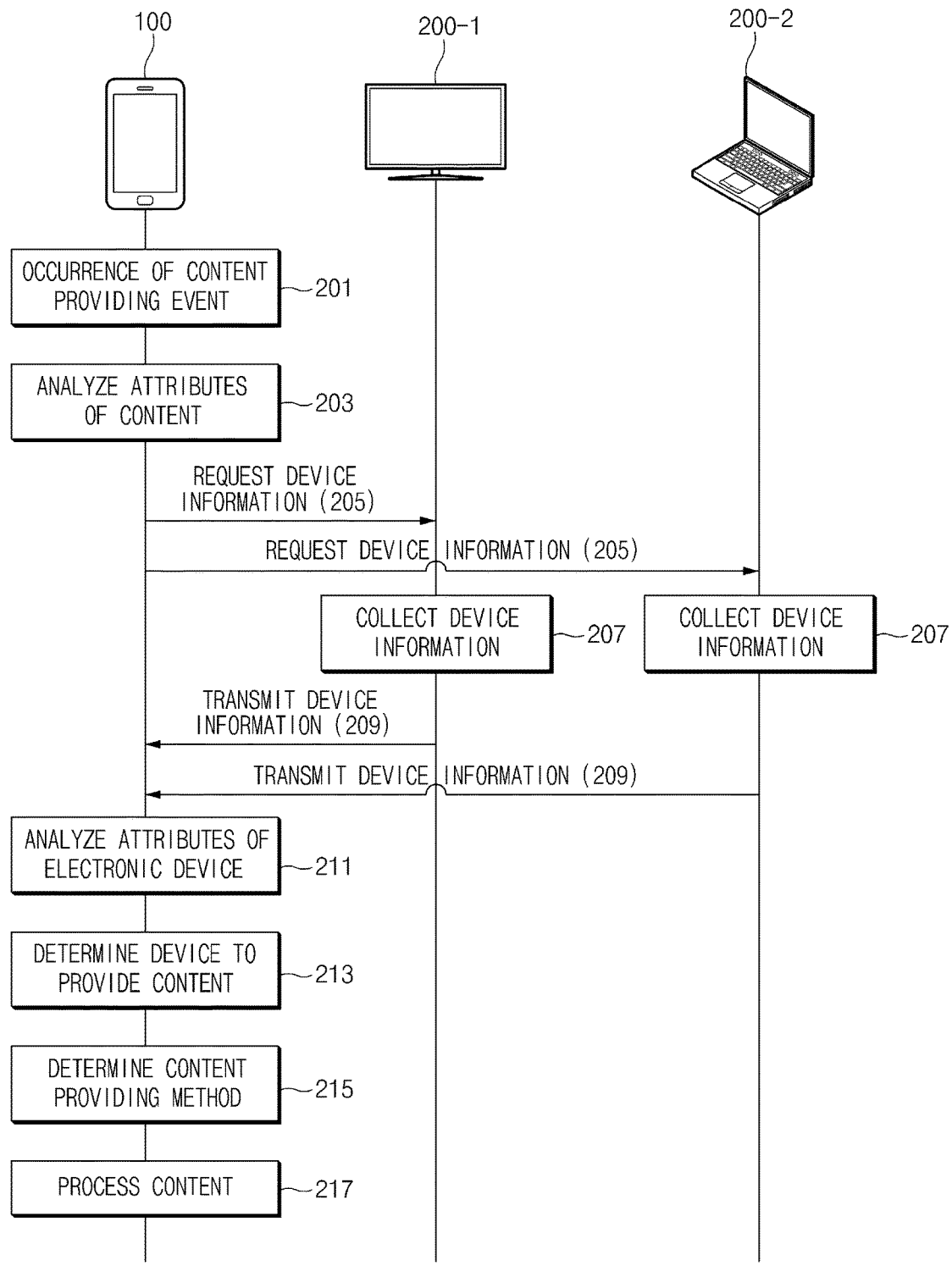
FIG. 2 is a signal sequence diagram illustrating a content providing method of a content providing system according to various embodiments of the present disclosure.

FIG. 2 is a signal sequence diagram illustrating a content providing method of a content providing system according to various embodiments of the present disclosure.

Referring to FIG. 2, in operation 201, a content providing event occurs in a main electronic device 100. The content providing event may refer to all events for providing content (or information) to a user such as, for example, a short message service (SMS) message received event, an instant message received event, an email received event, a schedule notification event, a news notification event, a weather forecast event, a sports game notification event, and the like.

In operation 203, the main electronic device 100 may analyze attributes of content. The attributes of the content may include, for example, at least one of type of the content, size of the content, security level of the content, or importance of the content. According to an embodiment of the present disclosure, the main electronic device 100 may analyze the attributes of the content using metadata of the content. According to an embodiment of the present disclosure, the main electronic device 100 may analyze the attributes of the content using details of the content.

In operation 205, the main electronic device 100 may request to the peripheral electronic devices 200-1 and 200-2 to transmit their device information. In operation 207, each of the peripheral electronic devices 200-1 and 200-2 may collect their respective device information. In operation 209, each of the peripheral electronic devices 200-1 and 200-2 may transmit their respective device information to the main electronic device 100.

In operation 211, the main electronic device 100 may analyze attributes of the main electronic device 100 and attributes of the peripheral electronic devices 200-1 and 200-2 using their device information. According to an embodiment of the present disclosure, the main electronic device 100 may analyze attributes of all available electronic devices connected to a network, which includes the main electronic device 100 itself. The attributes of an electronic device may include, for example, at least one of device identification information, security level of the electronic device, location of the electronic device, distance between the electronic device and a user, direction of the electronic device, input/output source, a possession (or stored) data list, or owner information of the electronic device.

In operation 213, the main electronic device 100 may determine at least one device to provide content to the user, according to the result of analyzing the attributes of the content and the result of analyzing the attributes of the main electronic device 100 and the peripheral electronic devices 200-1 and 200-2. According to an embodiment of the present disclosure, the main electronic device 100 may determine the device to provide the content, according to a security level of the content and a security level of an electronic device (e.g., the main electronic device 100 or the peripheral electronic device 200-1 and 200-2). For example, the main electronic device 100 may select a device having a security level corresponding to the security level of the content.

In operation 215, the main electronic device 100 may determine a content providing method. The main electronic device 100 may determine, for example, at least one of content providing type, content providing time, or details of content to be provided. In operation 217, the main electronic device 100 may process the content to determine the content providing device and the content providing method.

Figure 3:
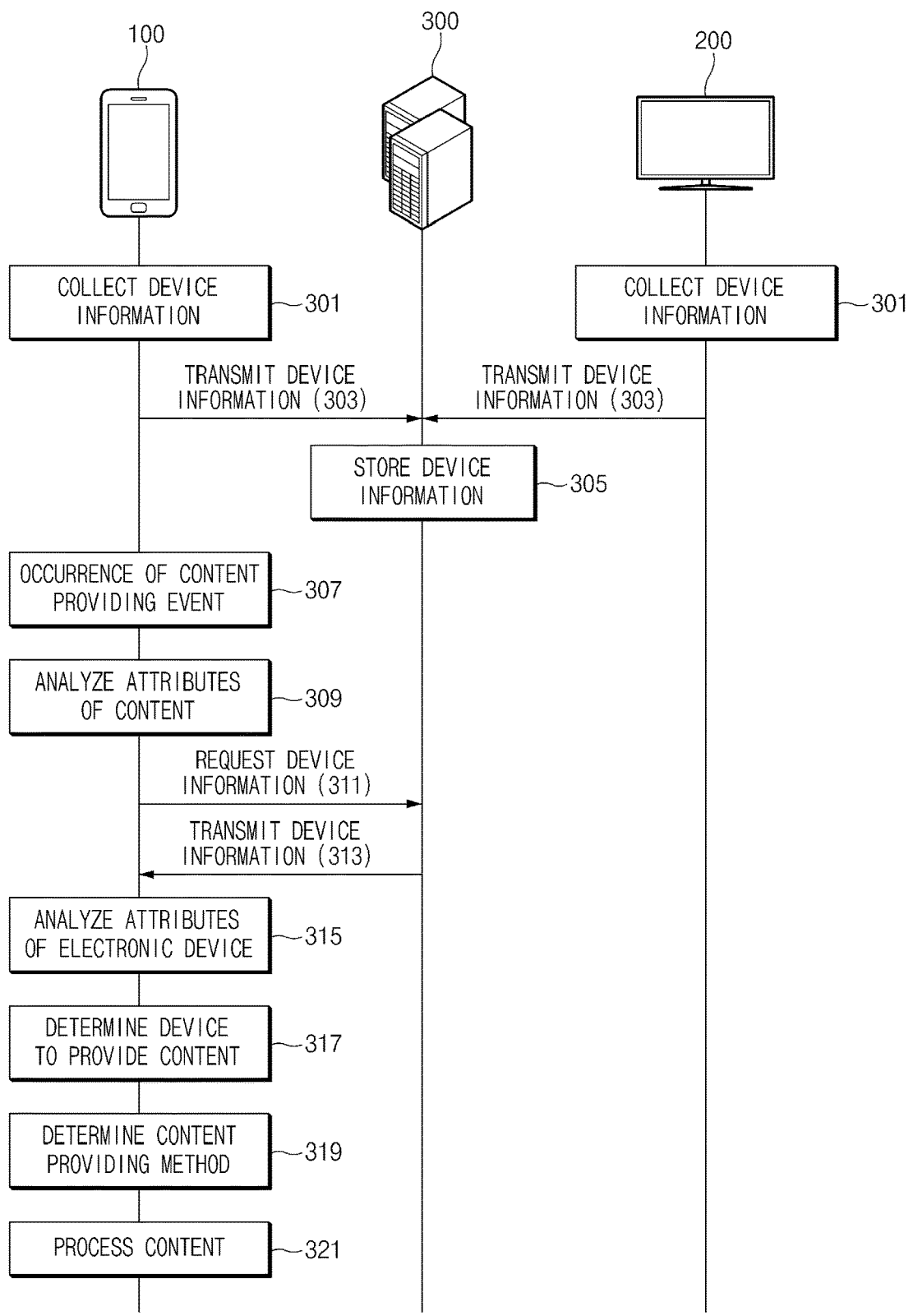
FIG. 3 is a signal sequence diagram illustrating a content providing method of a content providing system according to various embodiments of the present disclosure.

FIG. 3 is a signal sequence diagram illustrating a content providing method of a content providing system according to various embodiments of the present disclosure.

Referring to FIG. 3, in operation 301, the main electronic device 100 and the peripheral electronic device 200 may collect device information. In operation 303, each of the main electronic device 100 and the peripheral electronic device 200 may transmit the collected device information to the server 300.

In operation 305, the server 300 may store the device information from the main electronic device 100 and the peripheral electronic device 200. The stored device information in the server 300 may be updated with the more recently received device information from the main electronic device 100 and the peripheral electronic device 200.

In operation 307, a content providing event may occur in the main electronic device 100. The content providing event may refer to all events that may provide content to a user such as, for example, an SMS message received event, an instant message received event, an email received event, a schedule notification event, a news notification event, a weather forecast event, a sports game notification event, and the like.

In operation 309, the main electronic device 100 may analyze attributes of the content. The attributes of the content may include, for example, at least one of: type of the content, size of the content, security level of the content, and importance of the content. According to an embodiment of the present disclosure, the main electronic device 100 may analyze the attributes of the content using metadata of the content. According to an embodiment of the present disclosure, the main electronic device 100 may analyze the attributes of the content using details of the content.

In operation 311, the main electronic device 100 may request the server 300 to transmit device information. In operation 313, the server 300 may transmit the requested device information to the main electronic device 100. According to an embodiment of the present disclosure, if the device information is requested from the main electronic device 100, the server 300 may request the peripheral electronic device 200 to transmit its device information, may update the device information, and may transmit the updated device information to the main electronic device 100.

In operation 315, the main electronic device 100 may analyze attributes of the available electronic devices (e.g., the main electronic device 100 and the peripheral electronic device 200). The main electronic device 100 may analyze attributes of all available electronic devices connected to the network it is on, and that includes the main electronic device 100. The attributes of an electronic device may include, for example, at least one of: device identification information, security level of the electronic device, location of the electronic device, distance between the electronic device and the user, direction of the electronic device, input/output source, a possession (or stored) data list, and owner information of the electronic device.

In operation 317, the main electronic device 100 may determine at least one device to provide content to the user, according to the result of analyzing the attributes of the content and the result of analyzing the attributes of the available electronic devices (e.g., the main electronic device 100, and the peripheral electronic device 200). According to an embodiment of the present disclosure, the main electronic device 100 may determine the device to provide the content, according to the security level of the content and the security level of the electronic device. For example, the main electronic device 100 may select a device having a security level corresponding to the security level of the content.

In operation 319, the main electronic device 100 may determine a content providing method. The main electronic device 100 may determine, for example, at least one of content providing type, content providing time, or details of content to be provided.

In operation 321, the main electronic device 100 may process the content to determine the content providing device and the content providing method.

Figure 4:
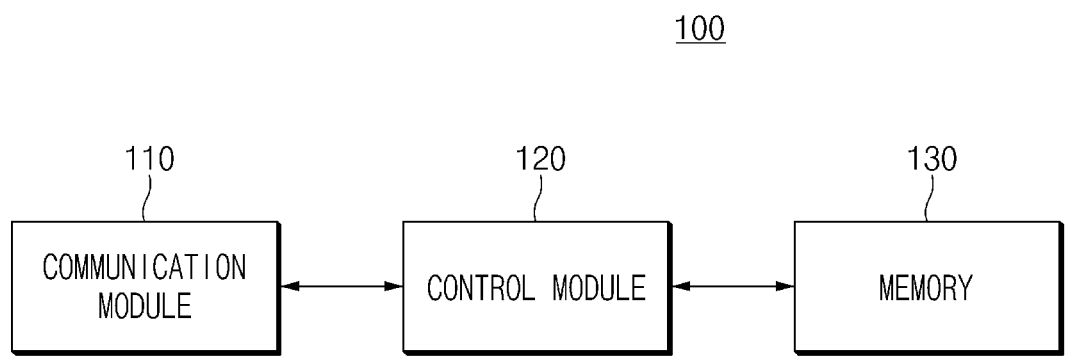
FIG. 4 is a block diagram illustrating a configuration of a main electronic device according to various embodiments of the present disclosure.

FIG. 4 is a block diagram illustrating a configuration of a main electronic device according to various embodiments of the present disclosure.

Referring to FIG. 4, a main electronic device 100 may include a communication module 110, a control module 120, and a memory 130.

The communication module 110 may communicate (or share) device information with one or more of the peripheral electronic devices 200-1 to 200-3 and the server 300 of FIG. 1. According to an embodiment of the present disclosure, if a content providing event occurs, the communication module 110 may request the peripheral electronic devices 200-1 to 200-3 and/or the server 300 to transmit their device information and may receive the device information from the peripheral electronic devices 200-1 to 200-3 and/or the server 300. According to an embodiment of the present disclosure, the communication module 110 may communicate (or share) a content context, a device context, or a user context with the peripheral electronic devices 200-1 to 200-3 and/or the server 300.

The control module 120 may control an overall operation of the main electronic device 100. The control module 120 may control the communication module 110 and/or the memory 130 to provide content to a user according to various embodiments of the present disclosure.

The control module 120 may analyze attributes of an electronic device. The control module 120 may analyze attributes of the main electronic device 100 and attributes of the peripheral electronic devices 200-1 to 200-3. According to an embodiment of the present disclosure, the control module 120 may analyze the attributes of the electronic device using device information. The attributes of the electronic device may include, for example, at least one of: device identification information, security level of the electronic device, location of the electronic device, distance between the electronic device and the user, direction of the electronic device, input/output source, possession (or stored) data list, or owner information of the electronic device.

The device identification information may refer to unique identification information for identifying the electronic device on a network. For example, the device identification information may be a media access control (MAC) address, a mobile station international ISDN number (MSISDN), an international mobile equipment identity (IMEI), an electronic serial number (ESN), a nickname provided to a device, and the like.

The security level of an electronic device may be determined according to a location of the electronic device, a size of the electronic device, a distance between the electronic device and the user, the number of users around the electronic device, locations of the users around the electronic device, a distance between the electronic device and each of the users, audio output type, and the like. The security level of the electronic device may be classified as, for example, a private level, a protected level, or a public level according to a degree of privacy protection. The private level may correspond to a level for an electronic device that may be used for a personal purpose and may have a low exposure risk of personal information to others when the personal information is displayed. The protected level may correspond to a level for an electronic device that may be used for a personal purpose, but may have a possibility that it will be located in a public place with the possibility that personal information will be exposed to others around the electronic device. The public level may correspond to a level for an electronic device which may be impossible to be used for a personal purpose and may be used by others, and may have a possibility that it will be located in a public place or a possibility that personal information will be exposed to users around the electronic device.

When determining that the electronic device is located within a distance close to the user, for example, if it is in contact with a body of the user to measure heartbeat of the user, the control module 120 may determine the security level of the corresponding electronic device to be private level. While the user possesses an electronic device (e.g., a monitor on the back of an airplane seat, a device for self-guided tour at a museum, and the like) that is not owned by the user, the control module 120 may temporarily determine a security level of the corresponding electronic device to be private level. For example, if an audio output of a specific electronic device is set to an earphone or a headphone, since there is no exposure risk of the content to others, the control module 120 may determine the security level of the corresponding electronic device to be private level. If the audio output of the specific electronic device is set to a speaker, since content can be exposed to others, the control module 120 may set the security level of the corresponding electronic device to be public level.

If the electronic device is located in a private space of a user (e.g., a home where he or she lives alone, a private room, or a place within his or her vehicle), the control module 120 may determine the security level of the corresponding electronic device to be private level. Still, although the electronic device is located in the private space, if another user is present in the private space (e.g., if a voice and motion of another person is recognized or if a new device is recognized), the control module 120 may determine the security level of the corresponding electronic device to be protected or public level. For example, although the electronic device is located in the private space, if a visitor is scheduled, the control module 120 may change the security level of the corresponding electronic device from private level to public level.

The location of the electronic device may include all information associated with a specific place, such as a bus stop, an airport, a company, a meeting room, a home, a living room, a kitchen, or a bathroom, or a location about whether the electronic device is inside or outside, as well as latitude/longitude. The location of the electronic device may be determined according to information collected through a global positioning system (GPS), Wi-Fi communication, Bluetooth communication, an ultraviolet ray (UV) sensor, and the like.

The distance between the electronic device and the user may refer to a physical distance between the electronic device and the user who uses the electronic device currently or is located around the electronic device. The distance between the electronic device and the user may be measured using, for example, a distance sensor using infrared rays, ultrasonic waves, and the like or an image module of a camera.

The direction of the electronic device may refer to a direction a display or an audio output module of the electronic device faces. The direction of the electronic device may be set relative to the user. For example, the direction of the electronic device may include information indicating whether the electronic device faces the user.

The input/output source may include information about the types of various input/output devices, such as a GPS, a camera, a biometric sensor (e.g., a heart rate sensor, a sight sensor, and the like), a gyro sensor, a display, a touch pad, a speaker, and an audio interface, included in an electronic device, and detailed information about currently available input/output device(s). The detailed information may include, for example, resolution of a display, frames per second of a display, and information about the type of content that may be input and output.

The owner information of the electronic device may be classified into an identifier (ID) of the user and a real name of the user.

According to an embodiment of the present disclosure, the control module 120 may analyze attributes of content. If a content providing event occurs, the control module 120 may analyze the attributes of the content using content information or device information. For example, the content information may include all information that may be directly verified from metadata or details of the content, such as type of the content (e.g., text, image, or audio, and the like), size of the content, content provider, content producer, content sender, content receiver, and details of the content. According to various embodiments of the present disclosure, the control module 120 may analyze the attributes of the content using at least one of the metadata of the content or the details of the content. The attributes of the content may include, for example, at least one of type of the content, size of the content, security level of the content, or importance of the content.

The type of the content may include information such as whether it is, for example, text, image, or audio. Also, the type of the content may include, for example, information associated with quality of data included in the content, such as resolution of an image or a sampling rate of the audio content. The size of the content may define data size for each type of data of the content.

The security level of the content may be determined according to details of the content, sender of the content, type of the content, and the like. The security level of the content may be classified as, for example, private level, protected level, or public level according to a degree of privacy protection. The private level may correspond to a level for content that is received from a person who has a personal relationship with the user or includes private details the user does not want to share with others. The protected level may correspond to a level for content that includes private details of the user, but may be shared with others or may be determined to be selectively shared with others by the user. The public level may correspond to a level for content that includes common information (e.g., weather information) received from a person who does not include private details of the user.

For example, if a phone number stored on a contact list, a specific keyword, or account information is included in details of the content, the control module 120 may determine the security level of the content to be private level. The control module 120 may determine, for example, the security level of an email or an SMS message received from a predetermined user (e.g., family or a friend) to be private level.

The importance of the content may be determined according to whether details of the content are urgent or include important information. The importance of the content may be specified by a content provider or a content sender or may be determined according to details of the content. For example, if an outdoor activity (e.g., a track meet or a golf date) of the user is scheduled in a user schedule, the control module 120 may determine the weather forecast for the corresponding date as an important content.

According to an embodiment of the present disclosure, the control module 120 may analyze the state of the user. The control module 120 may analyze the state of the user using device information. The state of the user may include, for example, at least one of activity state of the user, content recognizable state of the user, device preference of the user, or content preference of the user.

The activity state of the user may include information associated with a physical activity of the user, such as information indicating whether the user is asleep, working, driving, exercising, using any of a plurality of electronic devices, a physical state of the user, or the frequency of use of a specific electronic device. According to an embodiment of the present disclosure, the activity state of the user may be analyzed according to information collected from various sensors (e.g., a heart rate sensor, an acceleration sensor, a gyro sensor, a GPS, a sight sensor, and the like) among device information, the number of inputs of a user operation, or information indicating whether a display is activated.

The content recognizable state of the user may be analyzed according to a device context or an activity state of the user. According to an embodiment of the present disclosure, the content recognizable state of the user may be separately determined for all electronic devices. According to another embodiment of the present disclosure, the content recognizable state of the user may be determined relative to an electronic device that is currently used by the user or the most frequently used electronic device among a plurality of electronic devices of him or her. For example, if the user watches TV, the content recognizable state of the user may be determined relative to the TV. If the user drives a vehicle, the content recognizable state of the user may be determined relative to a navigation device or an HUD device. According to an embodiment of the present disclosure, the content recognizable state of the user may be determined primarily relative to information indicating whether the user may be able to look at an image.

The content recognizable state of the user may be classified into, for example, a stare state, a glimpse state, a sound only state, and a do not disturb (DND) state according to whether the user may recognize content of an image or text or whether the user may recognize content of an audio form. The stare state may be a state where the user may be able to look at a display for a long time and may refer to a state where the user may be able to look at all contents, such as text, a map, an image, or a video, that may be provided through the display. For example, if the user watches TV or surfs the web on a desktop PC, the content recognizable state of the user may be determined as the stare state.

The glimpse state may be a state where the user may only be able to glimpse at a display for a moment and may refer to a state where he or she may look at a short text or a simple image. For example, if the user rides a bicycle or drives a vehicle, the content recognizable state of the user may be determined as the glimpse state.

The sound only state may refer to a state where the user may not be able to look at a display but may be able to listen to audio output. For example, if the user wears an earphone or a headphone while having a smartphone in his or her pocket, the content recognizable state of the user may be determined as the sound only state.

The DND state may refer to a state where the user may not be able to look at the display and may not be able to listen to audio output. For example, if the user is asleep, if there is no user around the electronic device, or if the user is in conference, the content recognizable state of the user may be determined as the DND state.

The device preference of the user may be analyzed according to usage history of the user for a plurality of electronic devices or settings of the user. The content preference of the user may be analyzed according to content usage history of the user or settings of the user.

If a content providing event occurs, the control module 120 may determine at least one device to provide content, according to at least one of result of analyzing attributes of the electronic device, result of analyzing attributes of content, or result of analyzing a state of the user. The content providing event may refer to all events for providing content (or information) to the user, for example, an SMS message received event, an instant message received event, an email received event, a schedule notification event, a news notification event, a weather forecast event, a sports game notification event, and the like. The content providing event may occur by receiving content from the outside, a current location or time corresponding to a specific location or time, or a request of the user. For example, the content providing event may occur by receiving an email or weather forecast data, by the time of a scheduled meeting or appointment approaching the present time, or if the user directly requests information about a nearby restaurant.

According to an embodiment of the present disclosure, the control module 120 may determine a content providing device according to a security level of content. The control module 120 may determine an electronic device having a security level the same as or higher than the security level of the content as the content providing device. For example, if the security level of the content is the private level, and the security level of a smart TV is the public level, and the security level of a smartphone is the protected level, and the security level of a smart watch is the private level, the control module 120 may determine the smart watch as the content providing device.

According to an embodiment of the present disclosure, if there are a plurality of electronic devices having the same security level, the control module 120 may determine the content providing device according to a distance between each of the electronic devices and the user, a direction of each of the electronic devices, a location of each of the electronic devices, and owner of each of the electronic devices. For one example, the control module 120 may determine an electronic device nearest to the user as the content providing device. For another example, the control module 120 may determine an electronic device with its display facing the user as the content providing device. For another example, the control module 120 may determine a private device as the content providing device prior to a common device (or public device).

According to an embodiment of the present disclosure, the control module 120 may determine the content providing device according to the type of content. For example, if the content includes an image and text, the control module 120 may determine an electronic device able to display the image and text as the content providing device. According to an embodiment of the present disclosure, if no electronic device is able to output the type of content, the control module 120 may determine whether the type of the content may be changed. If the type of the content is changed, the control module 120 may determine an electronic device that is able to output the content of the changed form as the content providing device.

According to an embodiment of the present disclosure, the control module 120 may determine the content providing device according to a content recognizable state of the user. For one example, if the content recognizable state of the user is glimpse state and if the type of content is video, the control module 120 may determine an electronic device viewable to the user as the content providing device. If there is no electronic device viewable to the user, the control module 120 may determine an electronic device able to output sound as the content providing device. For another example, if the content recognizable state of the user is sound only state, the control module 120 may determine an electronic device able to output sound as the content providing device.

According to an embodiment of the present disclosure, the control module 120 may consider a device preference of the user when determining the content providing device. For example, if a device preference of the user for an electronic device determined as the content providing device is low, the control module 120 may query to the user (e.g. display a question on the display) whether the content should be provided through the determined electronic device.

If determining the device to provide the content, the control module 120 may determine a content providing method of the content providing device. The content providing method may include at least one of content providing type, content providing time, or details of content to be provided.

According to an embodiment of the present disclosure, the control module 120 may determine a content providing type according to an output source that will output the content. For example, if the main electronic device 100 supports a particular content type(s), the control module 120 may control the communication module 110 to output content as the particular content type(s) supported. However, if the main electronic device 100 does not support that particular content type, the control module 120 may change the content providing type to a content type that may be output.

According to an embodiment of the present disclosure, the control module 120 may determine a content providing type according to the content recognizable state of the user. For example, if an update on a baseball game is provided to the user and if the content recognizable state of the user is the glimpse state, the control module 120 may determine to output part of the information such as the inning and the score as an image or text, and to provide the more detailed information as audio.

According to an embodiment of the present disclosure, the control module 120 may determine details of content to be provided according to a security level of the device to provide the content. For example, if a security level of the electronic device is private level, the control module 120 may include details corresponding to the private level in the content. If the security level of the electronic device is public level, the control module 120 may exclude details corresponding to the private level from the content.

According to an embodiment of the present disclosure, the control module 120 may determine details of content to be provided according to the content recognizable state of the user. For example, if details of content include text data and if the content recognizable state of the user is glimpse state, the control module 120 may control the communication module 110 to provide only some of the data (e.g., some of a title or details). If an update for a baseball game is provided to the user and if the content recognizable state of the user is the stare state, the control module 120 may provide detailed information such as current inning, current score, score board, hitter information, pitcher information, and the like. If the relay information for the baseball game is provided to the user and if the content recognizable state of the user is the glimpse state, the control module 120 may summarize to provide only partial information such as current inning and current score.

According to an embodiment of the present disclosure, the control module 120 may determine the content providing type and may then determine details of content to be provided.

According to an embodiment of the present disclosure, the control module 120 may determine a content providing time according to the content recognizable state of the user. For example, if the content recognizable state of the user is the DND state, the control module 120 may control the communication module 110 to provide content after the content recognizable state of the user has changed to another state.

According to an embodiment of the present disclosure, the control module 120 may determine a content providing time according to an activity state of the user. For example, the control module 120 may interwork with a healthcare application and may verify a physical condition (e.g., a stress index or a heart rate) of the user. If the stress index or the heart rate of the user is high, the control module 120 may control the communication module 110 to provide content after the physical condition of the user has returned to a more normal condition.

If a content providing event occurs, the control module 120 may determine a notification method for the content providing event. The notification method may include, for example, information indicating whether notification is to be provided and/or the notification type (e.g., a sound or vibration).

According to an embodiment of the present disclosure, the control module 120 may determine a notification method according to the content recognizable state of the user. For one example, if the content recognizable state of the user is the stare state or the glimpse state, the control module 120 may inform the user of content together with details of content using a sound or vibration. For another example, if the content recognizable state of the user is the sound only state, the control module 120 may inform the user of content using sound. For another example, if the content recognizable state of the user is the DND state, the control module 120 does not provide notification.

According to an embodiment of the present disclosure, the control module 120 may determine a notification method according to importance of the content. If the importance of the content is high, the control module 120 may inform the user of content together with details of content using sound or vibration. If the importance of the content is low, the control module 120 may display only details of the content without the sound or vibration or may not provide notification.

According to an embodiment of the present disclosure, the control module 120 may determine a notification method using an activity state of the user. For one example, if it is determined that the user is at work or is playing outdoor sports, the control module 120 may display only details of content without sound or vibration or may not provide notification. For another example, if a stress index of the user is high, the control module 120 may display only details of content without sound or vibration or may not provide notification.

If a content providing event occurs, the control module 120 may determine the type of input interface for receiving a user input. The input interface may include, for example, a button, a touch pad, a voice recognition module, a gesture recognition module, and the like.

According to an embodiment of the present disclosure, the control module 120 may determine the type of input interface for receiving a user input, according to the content recognizable state of the user (e.g., a content providing type). For one example, if the content recognizable state of the user is the glimpse state, since the user may not be able to operate a button or a touch pad, the control module 120 may activate a voice recognition module or a gesture recognition module. For another example, if the user is in a conference, or if the content recognizable state of the user is DND state, the control module 120 may activate the gesture recognition module.

If the content providing method is determined, the control module 120 may process the content according to the determined content providing method. If the processing of the content is completed, the control module 120 may provide the processed content to the user. If the content providing device is the main electronic device 100, the control module 120 may control the display and/or the audio output module to output the processed content. If the content providing device is one of the peripheral electronic devices 200-1 to 200-3, the control module 120 may control the communication module 110 to transmit the processed content to the determined content providing device.

According to an embodiment of the present disclosure, the control module 120 may determine a plurality of electronic devices as the content providing device. In that case, the control module 120 may determine the content providing method of each of the plurality of electronic devices and may provide content to the user through the plurality of electronic devices.

According to an embodiment of the present disclosure, the control module 120 may verify device information of the peripheral electronic devices 200-1 to 200-3. If the owner of the peripheral electronic devices 200-1 to 200-3 is different from that of the main electronic device 100 or is a common device (or public device), the control module 120 may control deletion of personal information and the like stored in the peripheral electronic devices 200-1 to 200-3 before a connection with a corresponding peripheral electronic device is ended.

The memory 130 may store device information. According to an embodiment of the present disclosure, the memory 130 may store device information of the peripheral electronic devices 200-1 to 200-3, which is received through the communication module 110, as well as device information of the main electronic device 100. The memory 130 may store device information for each electronic device. If new device information is verified or received, the control module may update the stored device information.

The memory 130 may store a device context, a content context, or a user context. The memory 130 may store a device context for each electronic device. If a context is changed, the memory 130 may update the stored context.

According to various embodiments of the present disclosure, the main electronic device 100 may include a communication module 110 configured to request at least one peripheral electronic device located in a coverage range of the main electronic device 100 to transmit device information. The main electronic device 100 may also include a control module 120 configured to analyze the attributes of the content using content information if a content providing event occurs, to analyze attributes of the peripheral electronic devices using the device information, and to determine at least one device that can provide the content to a user, according to the result of analyzing the attributes of the content and the result of analyzing the attributes of the peripheral electronic devices.

According to various embodiments of the present disclosure, the control module may analyze the security level of the content and the security level of the peripheral electronic device(s) if the content providing event occurs and may determine at least one device to provide the content to the user, according to the security level of the content and the security level of the peripheral electronic devices.

According to various embodiments of the present disclosure, the control module may analyze the attributes of the content using metadata of the content.

According to various embodiments of the present disclosure, the control module may analyze the attributes of the content using details of the content.

According to various embodiments of the present disclosure, the attributes of the content may include at least one of type of the content, size of the content, security level of the content, or importance of the content.

According to various embodiments of the present disclosure, the attributes of a peripheral electronic device may include at least one of device identification information, security level of the peripheral electronic device, location of the peripheral electronic device, distance between the peripheral electronic device and a user, direction of the peripheral electronic device, input/output sources, possession (or stored) data list, and owner information of the peripheral electronic device.

According to various embodiments of the present disclosure, the control module may analyze a state of a user and may determine at least one device to provide the content to the user according to the result of analyzing the content and the attributes of the peripheral electronic devices and the result of analyzing the state of the user.

According to various embodiments of the present disclosure, the state of the user may include at least one of activity state of the user, content recognizable state of the user, device preference of the user, and content preference of the user.

According to various embodiments of the present disclosure, the control module may determine a content providing method of the determined device(s) and may control processing of the content according to the determined content providing method.

Figure 5:
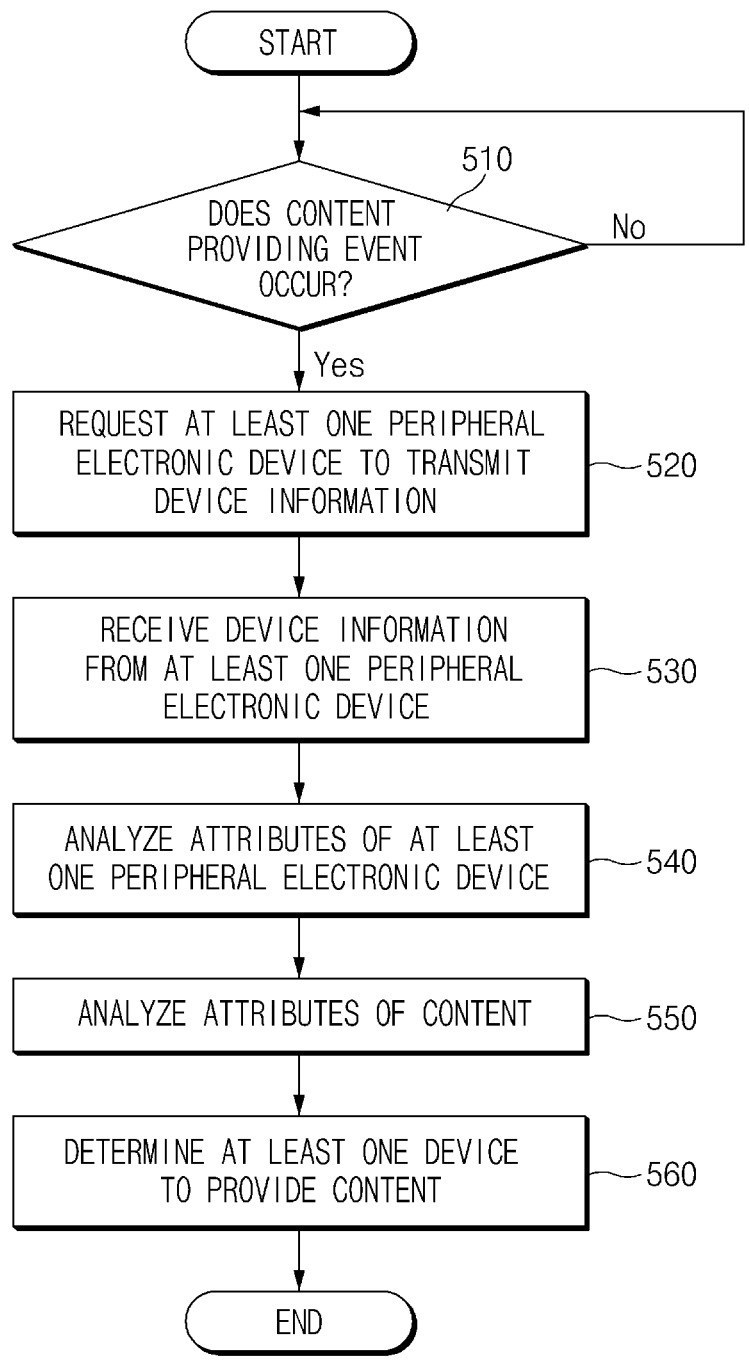
FIG. 5 is a flowchart illustrating a content providing method of a main electronic device according to various embodiments of the present disclosure.

FIG. 5 is a flowchart illustrating a content providing method of a main electronic device according to various embodiments of the present disclosure. Operations shown in FIG. 5 may include operations processed in a main electronic device 100 shown in FIG. 4. Therefore, contents described about the main electronic device 100 with reference to FIG. 4 may be applied to the operations shown in FIG. 5.

Referring to FIG. 5, in operation 510, the main electronic device 100 may determine whether a content providing event occurs. The content providing event may refer to all events for providing content (or information) to a user such as, for example, a short message service (SMS) message received event, an instant message received event, an email received event, a schedule notification event, a news notification event, a weather forecast event, a sports game notification event, and the like. The content providing event may occur, for example, by receiving content from a device external to the main electronic device 100, by a current location or time corresponding to a specific location or scheduled event time, or by a request of a user.

If the content providing event occurs, in operation 520, the main electronic device 100 may request at least one of the peripheral electronic device 200-1 to 200-3 to transmit device information. The device information may include information about the peripheral electronic devices 200-1 to 200-3 and information about a user of the peripheral electronic devices 200-1 to 200-3 such as, for example, device identification information, information about whether the peripheral electronic devices 200-1 to 200-3 are available, location of the peripheral electronic devices 200-1 to 200-3, the number of users around the peripheral electronic devices 200-1 to 200-3, locations of the users around the peripheral electronic devices 200-1 to 200-3, distance between the peripheral electronic devices 200-1 to 200-3 and the user, user identification information, whether viewable to the user, information about whether the user is performing physical activities, information about whether the user is asleep, location of the user, device preference of the user, device usage history of the user, content usage history of the user, input/output sources, type of content (e.g., an image and/or audio format) that may be output, audio output type (e.g., an earphone, a speaker, etc.), environment settings (e.g., volume, screen brightness, and the like), etc.

In operation 530, the main electronic device 100 may receive the device information from the peripheral electronic devices 200-1 to 200-3. In operation 540, the main electronic device 100 may analyze attributes of the peripheral electronic devices 200-1 to 200-3. The attributes of the peripheral electronic devices 200-1 to 200-3 may include, for example, at least one of device identification information, security levels of the peripheral electronic devices 200-1 to 200-3, locations of the peripheral electronic devices 200-1 to 200-3, distance between the peripheral electronic devices 200-1 to 200-3 and a user, directions of the peripheral electronic devices 200-1 to 200-3, input/output sources, possession (or stored) data list, and owner information of the peripheral electronic devices 200-1 to 200-3. The main electronic device 100 may analyze attributes of the main electronic device 100 as well as the peripheral electronic devices 200-1 to 200-3.

In operation 550, the main electronic device 100 may analyze attributes of the content. According to an embodiment of the present disclosure, the main electronic device 100 may analyze the attributes of the content using content information and/or device information. The attributes of the content may include, for example, at least one of: type of the content, size of the content, security level of the content, and importance of the content.

In operation 560, the main electronic device 100 may determine at least one device to provide the content to the user. The main electronic device 100 may determine the device(s) to provide the content to the user from the plurality of electronic devices (e.g., the main electronic device 100 and the peripheral electronic devices 200-1 to 200-3).

According to an embodiment of the present disclosure, the main electronic device 100 may determine the device(s) to provide the content according to at least one of the result of analyzing the attributes of the peripheral electronic devices 200-1 to 200-3 and/or the attributes of the content. According to an embodiment of the present disclosure, the main electronic device 100 may determine the content providing device according to a security level of the content. For example, the main electronic device may determine an electronic device as the content providing device if that device has a security level the same as or higher than the content.

According to an embodiment of the present disclosure, if there are a plurality of electronic devices having the same security level, the main electronic device 100 may determine the content providing device according to a distance between each of the electronic devices and the user, a direction of each of the electronic devices, the location of each of the electronic devices, and/or an owner of each of the electronic devices.

According to an embodiment of the present disclosure, the main electronic device 100 may determine the content providing device according to a type of the content. For example, the main electronic device 100 may determine an electronic device that has an output source corresponding to the type of the content as the content providing device. According to an embodiment of the present disclosure, if no electronic device has the output source corresponding to the type of the content, the main electronic device 100 may determine whether the type of the content may be changed. If the type of the content is changed, the main electronic device 100 may determine an electronic device that has an output source corresponding to the content of the changed type as the content providing device.

According to an embodiment of the present disclosure, the main electronic device 100 may determine the content providing device according to a content recognizable state of the user.

According to an embodiment of the present disclosure, the main electronic device 100 may consider a device preference of the user when determining the content providing device. For example, if a device preference of the user for the electronic device determined as the content providing device is low, the main electronic device 100 may ask the user whether content should still be provided through the determined content providing device.

According to an embodiment of the present disclosure, the main electronic device 100 may analyze a state of the user. The main electronic device 100 may analyze the state of the user using device information. The state of the user may include, for example, at least one of activity state of the user, content recognizable state of the user, device preference of the user, and content preference of the user. According to an embodiment of the present disclosure, the main electronic device 100 may determine the device to provide the content according to at least one of the result of analyzing attributes of the content, the attributes of the peripheral electronic devices 200-1 to 200-3, and the state of the user.

According to an embodiment of the present disclosure, if determining the device to provide the content, the main electronic device 100 may determine a content providing method of the content providing device. The content providing method may include at least one of content providing form, content providing time, and details of content to be provided.

According to an embodiment of the present disclosure, the main electronic device 100 may determine a content providing type according to an available output source of the device to provide the content. According to an embodiment of the present disclosure, the main electronic device 100 may determine details of content to be provided according to a security level of the device to provide the content. According to an embodiment of the present disclosure, the main electronic device 100 may determine details of content to be provided according to a content recognizable state of the user. According to an embodiment of the present disclosure, the main electronic device 100 may determine a content providing type and may then determine details of content. According to an embodiment of the present disclosure, the main electronic device 100 may determine a content providing time according to a content recognizable state of the user.

If determining the content providing method, the main electronic device 100 may process the content according to the determined content providing method. If the processing of the content is completed, the main electronic device 100 may provide the processed content to the user.

According to various embodiments of the present disclosure, the content providing method of the electronic device may include requesting at least one peripheral electronic device located in a coverage range of the electronic device to transmit device information if a content providing event occurs, analyzing attributes of the peripheral electronic device(s) using the device information if receiving the device information from the peripheral electronic device(s), analyzing attributes of content using content information, and determining at least one device to provide the content to a user according to the result of analyzing the attributes of the content and the result of the analyzing the attributes of the peripheral electronic device(s).

According to various embodiments of the present disclosure, analyzing attributes of the content may include analyzing a security level of the content. Analyzing attributes of a peripheral electronic device may include analyzing a security level of the peripheral electronic device.

According to various embodiments of the present disclosure, analyzing the attributes of the content may include analyzing the attributes of the content using metadata of the content.

According to various embodiments of the present disclosure, analyzing the attributes of the content may include analyzing the attributes of the content using details of the content.

According to various embodiments of the present disclosure, the attribute of the content may include at least one of: type of the content, size of the content, security level of the content, and importance of the content.

According to various embodiments of the present disclosure, the attributes of a peripheral electronic device may include at least one of: device identification information, security level of the peripheral electronic device, location of the peripheral electronic device, distance between the peripheral electronic device and the user, direction of the peripheral electronic device, input/output sources, possession (or stored) data list, and owner information of the peripheral electronic device.

According to various embodiments of the present disclosure, the content providing method may further include analyzing a state of the user and determining at least one device to provide the content to the user, according to the result of analyzing the attributes of the content, the result of analyzing the attributes of the peripheral electronic device(s), and the result of analyzing the state of the user.

According to various embodiments of the present disclosure, the state of the user may include at least one of: activity state of the user, content recognizable state of the user, device preference of the user, and content preference of the user.

According to various embodiments of the present disclosure, the content providing method may further include determining a content providing method of the determined electronic device(s) and processing the content according to the determined content providing method.

Figure 6A:
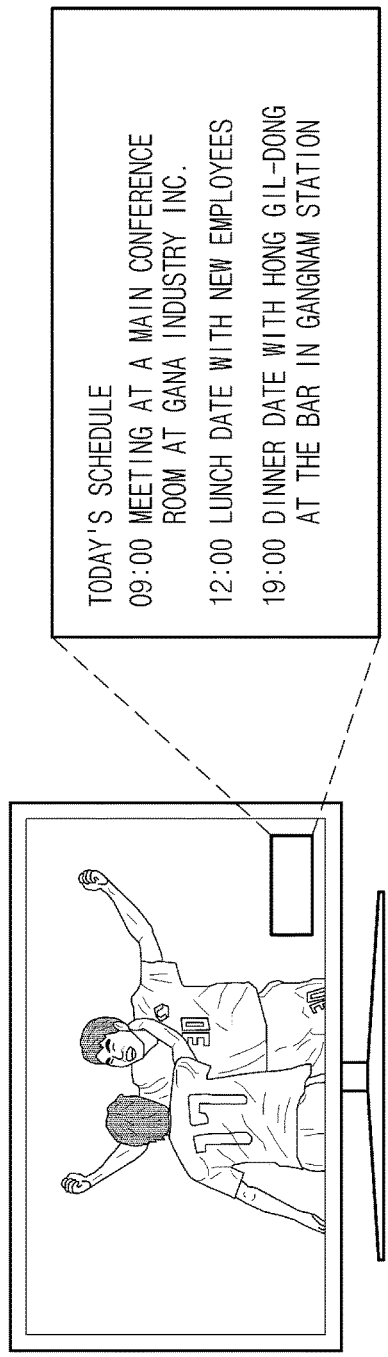
FIGS. 6A and 6B are drawings illustrating content provided to a user according to various embodiments of the present disclosure.
Figure 6B:
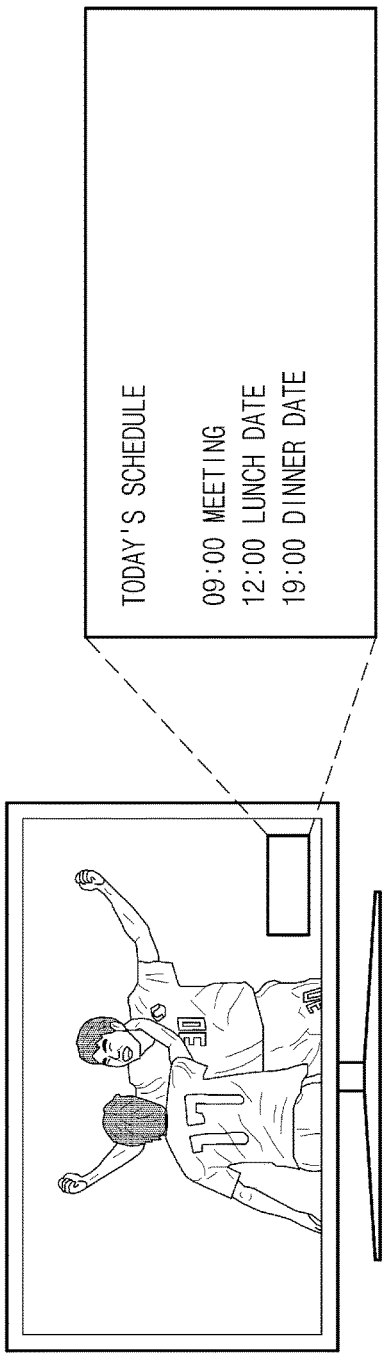

FIGS. 6A and 6B are drawings illustrating content provided to a user according to various embodiments of the present disclosure.

FIG. 6A illustrates an example of schedule information provided in a situation where a user watches TV in his or her living room of a home where he or she lives alone. An event for providing schedule information to the user may occur when the user has his or her smartphone and is watching TV. The smartphone (e.g., the main electronic device 100) may analyze device attributes, content attributes, and a state of the user to determine a device to provide a reminder of a scheduled meeting to the user.

The smartphone may analyze device attributes of the TV, content attributes, and the state of the user as follows:

TABLE 1

| | | [Device context] - TV | | | | | | |
|---|---|---|---|---|---|---|---|---|
| | Privacy | Location | | | Resource | | | |
| ID | Level | Place | Distance | Direction | Input | Data | Output | Owner |
| ID 1 | Private | Living room | 3 m | N/A | ... | ... | All Text: 1000 bytes | User A |

TABLE 2

| | [User context] | | |
|---|---|---|---|
| | | Recognizable state | user preference |
| Activity state of user | | of user | device | content |
| Location: home State: watching TV Frequency in use of host device: low | | Glimpse | 1. Smartphone 2. TV | ... |

TABLE 3

| | [Content context] | | |
|---|---|---|---|
| Format | | | |
| Type | Size | Privacy Level | Importance |
| Text Map | Text 200 bytes Map 500 kb | Name: Private Event: Protected Time: Public | Content: High Name: normal Event: normal Time: High |

Since the TV is located in the living room of the home where the user lives alone and since there is no risk of private information being exposed to others, the security level of the device context may be set to a private level. The activity state of the user of the user context may be determined that the user is watching TV at home and frequency of using the main electronic device at home is low. The content recognizable state of the user may be determined as a stare state relative to the TV and may be determined as a glimpse state relative to the smartphone.

The content context may include a data type and a size of each data, which are included in schedule information. For example, the schedule information may include text data and map data indicating the meeting location. A security level of content may be designated for each content configuration (or each data field) of the schedule information. A security level for the content configuration of the schedule information may be included in metadata and may be analyzed using contact information and the like. For data whose security level may not have been analyzed, the security level may be designated as private level. Importance of content may be designated for one content or may be designated for each element (or each data field) of the content.

Although the smartphone has higher preference than the TV in the device preference of the user context, if the user is watching TV, since frequency in operation of the smartphone is low, the smartphone may determine the TV as the content providing device. Also, since output data of a device context of the TV is designated as text, the smartphone may determine to display the text and the map on the TV. Since the security level of the TV is private level and since the text output size of the TV is 1000 bytes, the smartphone may determine that the entire text of 200 bytes included in schedule information can be displayed. Accordingly, all information for the schedule meeting such as time, type of schedule, place, and attendee, may be displayed on the TV.

FIG. 6B illustrates an example of schedule information provided if a visitor is at the home of the user and that visitor is recognized as not having access to the private information of the user. Accordingly, the device context of the TV may be changed as follows:

TABLE 4

| | Privacy | Location | | | Resource | | | |
|---|---|---|---|---|---|---|---|---|
| ID | Level | Place | Distance | Direction | Input | Data | Output | Owner |
| ID 1 | Protected | Living Room | 3 m | N/A | ... | ... | All Text: 1000 byte | User A |

Although a visitor is recognized, since the TV is located in the private space of the user, the smartphone may determine the security level of the TV as a protected level. Accordingly, the smartphone may provide only information at the protected level or the public level for the scheduled meeting. For example, referring to FIG. 6B, only the non-private level information of time and the type of the meetings may be displayed.

Figure 7A:
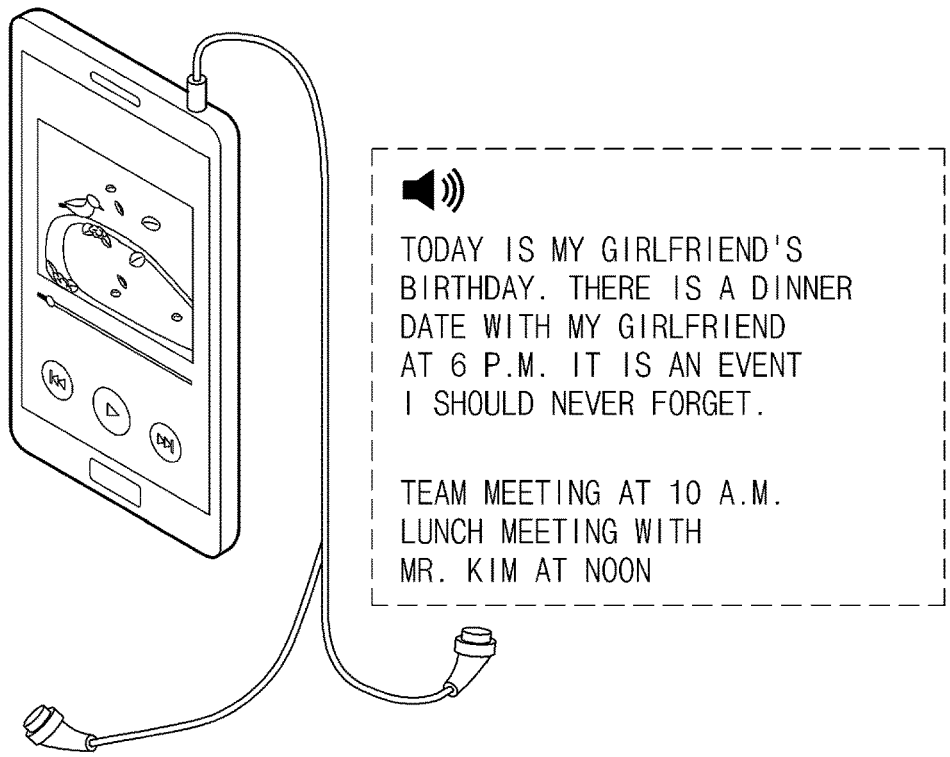
FIGS. 7A and 7B are drawings illustrating content provided to a user according to various embodiments of the present disclosure.
Figure 7B:
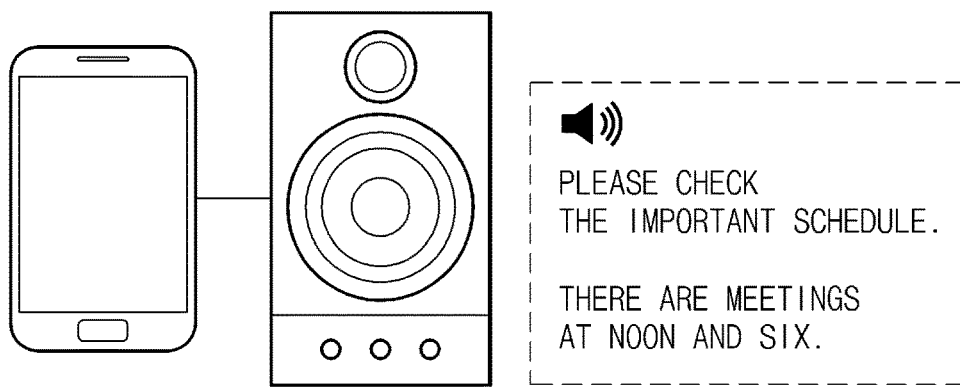

FIGS. 7A and 7B are drawings illustrating content provided to a user according to various embodiments of the present disclosure.

FIG. 7A illustrates an example in which schedule information is provided as audio output in a situation when an earphone is connected to a smartphone (e.g., the main electronic device 100). Content for an event may be provided by audio when an earphone is connected to the smartphone. Since there is no risk of others hearing content disclosed via the earphone, the security level of the smartphone may be set to private level. Therefore, the smartphone may be determined as a device with which to provide content to the user and may provide all schedule information to the user.

FIG. 7B illustrates an example of the schedule information being provided as audio when audio is being output via, for example, the smartphone's speaker. If other users are present around the smartphone, since there is a risk that others may hear the audio message, the security level of the smartphone may be set to public level. Therefore, the smartphone may determine to provide only schedule information corresponding to the public level to the user via the speaker. Schedule information including the private level may be provided in the form of text or image through a display of a wearable device connected with the smartphone.

FIGS. 8A and 8B are drawings illustrating content provided to a user according to various embodiments of the present disclosure.

FIG. 8A illustrates an example in which schedule information is provided in a situation where a user is in a vehicle alone. An event for providing schedule information may occur in a state where the user drives the vehicle. A smartphone (e.g., the main electronic device 100) may determine a content recognizable state of the user as a glimpse state when the user is driving the vehicle. Therefore, the smartphone may determine that an audio, video, navigation (AVN) device mounted in the vehicle, which is viewable to the user, is the device to provide content to the user. Since there are no passengers, a security level of the AVN device may be set to private level. Therefore, the AVN device may provide all schedule information, such as the type of the scheduled item (e.g., a meeting), the time, the subject, the attendees, and the location of the meeting to the user.

FIG. 8B illustrates an example where schedule information is provided when the user is sharing the vehicle with a fellow passenger. An event for providing the schedule information may occur when the user is driving the vehicle. The smartphone may determine a content recognizable state of the user as a glimpse state. Therefore, the smartphone may determine the AVN device, which is viewable to the user and is mounted on the vehicle, as the device to provide content to the user. Since there is a passenger in the vehicle, the security level of the AVN device may be set to public level. Therefore, the AVN device may provide only time information corresponding to the public level to the user.

The terminology "module" used herein may mean, for example, a unit including one of hardware, software, and firmware or combinations thereof. The term "module" may be used interchangeably with, for example, "unit," "logic," "logical block," "component," "circuit," and the like. The "module" may be a minimum unit of an integrated component or a part thereof. The "module" may be a minimum unit performing one or more functions or a part thereof. The "module" may be mechanically or electronically implemented. For example, a "module" may be at least one of application-specific integrated circuit (ASIC) chip, field-programmable gate array (FPGA), or a programmable-logic device, or other devices that may be developed for performing operations.

According to various embodiments of the present disclosure, at least a part of a device (e.g., modules or the functions) or a method (e.g., operations) may be implemented with, for example, instructions stored in a computer-readable storage media. The instructions may be executed by a processor (e.g., a control module 120 of FIG. 4), where the processor may comprise a plurality of processors. The computer-readable storage media may be, for example, the memory 130 of FIG. 4.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like, including other storage media that may yet be developed. Also, the program instructions may include not only executable codes compiled by a compiler but also high-level language codes that may be executed by a computer using an interpreter and the like. The above-mentioned hardware device may be configured to operate as or with one or more software modules to perform operations according to various embodiments of the present disclosure, and vice versa.

Modules or program modules according to various embodiments of the present disclosure may include at least one or more of the above-mentioned components. In various embodiments, some of the above-mentioned components may be omitted, or other additional components may be further included. Operations executed by modules, program modules, and/or other components may be executed by a sequential method, a parallel method, a recursive method, or a heuristic method. Also, some operations may be executed in a different order or may be omitted, and other operations may be added.

According to various embodiments of the present disclosure, the electronic device may provide content more conveniently and easily recognized by the user to the user and may reduce unnecessary exposure of personal information by considering an electronic device, content, state of the user, and the like when providing the content to the user.

Embodiments of the present disclosure described and shown in the drawings are provided as examples to describe technical content and to help understand the disclosure, but do not limit the scope of the present disclosure. Accordingly, it should be understood that besides the embodiments listed herein, all modifications or modified forms derived based on the technical ideas of the present disclosure are included in the scope of the present disclosure as defined in the claims, and their equivalents.

What is claimed is:

1. A first electronic device comprising:
a communication circuit; and
at least one processor configured to:
request device information of at least one second electronic device from the at least one second electronic device, and receive the device information from the at least one second electronic device via the communication circuit,
when a content providing event occurs for providing content to a user of the first electronic device, determine a security level of a content of the content providing event,
determine a first security level of the first electronic device with access to its device information and a second security level of the at least one second electronic device, using the received device information, and
determine at least one target electronic device to provide the content to the user from among the first electronic device and the at least one second electronic device,
wherein the first security level and the second security level are the same as or higher than the security level of the content,
wherein the at least one processor is further configured to:
analyze a state of the user, and
determine the at least one target electronic device to provide the content to the user, according to a result of analyzing the state of the user, and
wherein the state of the user comprises at least one of: an activity state of the user, a content recognizable state of the user, a device preference of the user, or a content preference of the user.

2. The first electronic device of claim 1,
wherein the at least one processor is further configured to analyze attributes of the content and attributes of the first electronic device and the at least one second electronic device to determine the at least one target electronic device to provide the content to the user from among the first electronic device and the at least one second electronic device, and
wherein the at least one target electronic device is determined according to a result of analyzing the attributes of the content and a result of analyzing the attributes of the first electronic device and the at least one second electronic device.

3. The first electronic device of claim 2, wherein the at least one processor is further configured to determine the security level and analyze the attributes of the content using metadata of the content.

4. The first electronic device of claim 2, wherein the at least one processor is further configured to determine the security level and analyze the attributes of the content using details of the content.

5. The first electronic device of claim 2, wherein the attributes of the content comprise at least one of: a type of the content, a size of the content, or an importance of the content.

6. The first electronic device of claim 2, wherein the attributes of each of the first electronic device and the at least one second electronic device comprise at least one of: device identification information, a location of a device, a distance between the user and the device, a direction of the device, input and output sources, a stored data list, or owner information of the device.

7. The first electronic device of claim 2,
wherein the at least one processor is further configured to determine a content providing method of the at least one target electronic device and to process the content according to the determined content providing method, and
wherein the content providing method comprises at least one of: a content providing type, a content providing time, or details of the content.

8. A content providing method of a first electronic device, the method comprising:
requesting device information of at least one second electronic device from the at least one second electronic device;
determining a first security level of the first electronic device and a second security level of the at least one second electronic device using the device information;
when a content providing event occurs for providing content to a user of the first electronic device, determining a security level of a content of the content providing event; and
determining at least one target electronic device to provide the content to the user from among the first electronic device and the at least one second electronic device,
wherein the first security level and the second security level are the same as or higher than the security level of the content,
wherein the method further comprises:
analyzing a state of the user; and
determining the at least one target electronic device to provide the content to the user, according to a result of analyzing the state of the user, and wherein the state of the user comprises at least one of: an activity state of the user, a content recognizable state of the user, a device preference of the user, or a content preference of the user.

9. The method of claim 8, further comprising:
analyzing attributes of the content;
analyzing attributes of the first electronic device and the at least one second electronic device; and determining the at least one target electronic device to provide the content to the user from among the first electronic device and the at least one second electronic device, wherein the at least one target electronic device is determined according to a result of analyzing the attributes of the content and a result of analyzing the attributes of the first electronic device and the at least one second electronic device.

10. The method of claim 9, wherein the analyzing of the attributes of the content comprises analyzing the attributes of the content using metadata of the content.

11. The method of claim 9, wherein the analyzing of the attributes of the content comprises analyzing the attributes of the content using details of the content.

12. The method of claim 9, wherein the attributes of the content comprise at least one of: a type of the content, a size of the content, or an importance of the content.

13. The method of claim 9, wherein the attributes of each of the first electronic device and the at least one second electronic device comprise at least one of: device identification information, a location of a device, a distance between the user and the device, a direction of the device, input and output sources, a stored data list, or owner information of the device.

14. The method of claim 9, further comprising:
determining a content providing method of the at least one target electronic device; and
processing the content according to the determined content providing method,
wherein the content providing method comprises at least one of: a content providing type, a content providing time, or details of the content.

15. A non-transitory computer-readable recording medium having embodied thereon a program in a first electronic device for executing a method, the method comprising:
requesting device information of at least one second electronic device from the at least one second electronic device;
determining a first security level of the first electronic device and a second security level of the at least one second electronic device using the device information;
when a content providing event occurs for providing content to a user of the first electronic device, determining a security level of a content of the content providing event; and
determining at least one target electronic device to provide the content to the user from among the first electronic device and the at least one second electronic device,
wherein the first security level and the second security level are the same as or higher than the security level of the content,
wherein the method further comprises:
analyzing a state of the user; and
determining the at least one target electronic device to provide the content to the user, according to a result of analyzing the state of the user, and
wherein the state of the user comprises at least one of: an activity state of the user, a content recognizable state of the user, a device preference of the user, or a content preference of the user.

16. The non-transitory computer-readable recording medium of claim 15, further comprising:
analyzing attributes of the content; and
analyzing attributes of the first electronic device and the at least one second electronic device.

* * * * *